US009270120B2

(12) United States Patent
Nuqui et al.

(10) Patent No.: US 9,270,120 B2
(45) Date of Patent: Feb. 23, 2016

(54) METHODS, SYSTEMS, AND COMPUTER READABLE MEDIA FOR ADAPTIVE OUT OF STEP PROTECTION FOR POWER GENERATORS WITH LOAD RESYNCHRONIZATION CAPABILITY

(71) Applicant: ABB Research Ltd., Zurich (CH)

(72) Inventors: Reynaldo F. Nuqui, Cary, NC (US); Yao Chen, Beijing (CN); Jiuping Pan, Raleigh, NC (US)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 14/428,630

(22) PCT Filed: Oct. 9, 2012

(86) PCT No.: PCT/CN2012/082627
§ 371 (c)(1),
(2) Date: Mar. 16, 2015

(87) PCT Pub. No.: WO2014/056144
PCT Pub. Date: Apr. 17, 2014

(65) Prior Publication Data
US 2015/0222122 A1    Aug. 6, 2015

(51) Int. Cl.
*H02J 1/00* (2006.01)
*H02J 3/00* (2006.01)
*H02J 3/40* (2006.01)
*H02P 1/02* (2006.01)
*H02P 9/00* (2006.01)

(52) U.S. Cl.
CPC . *H02J 3/40* (2013.01); *H02P 1/029* (2013.01); *H02P 9/006* (2013.01); *Y10T 307/729* (2015.04); *Y10T 307/735* (2015.04)

(58) Field of Classification Search
CPC ... H02J 3/40; Y10T 307/735; Y10T 307/729; H02P 9/006
USPC .......................................... 307/86, 87; 361/20
See application file for complete search history.

(56) References Cited

U.S. PATENT DOCUMENTS

| 4,953,052 A  * | 8/1990 | Cartlidge ............... H02H 7/062 |
| | | 307/129 |
| 2008/0201020 A1 | 8/2008 | Scholtz et al. |

FOREIGN PATENT DOCUMENTS

| EP | 2 118 996 B1 | 8/2011 |
| EP | 2 453 572 B1 | 2/2013 |
| WO | WO 2011/070520 A2 | 6/2011 |

OTHER PUBLICATIONS

Notification of Transmittal of the International Search Report and the Written Opinion of the International Searching Authority, or the Declaration for International Application No. PCT/CN2012/082627 (Jul. 11, 2013).

*Primary Examiner* — Carlos Amaya
(74) *Attorney, Agent, or Firm* — Jenkins, Wilson, Taylor & Hunt, P.A.

(57) ABSTRACT

Methods, systems, and computer readable media for adaptive out of step protection for power generators with load resynchronization capability are disclosed. According to one method, when a fault condition occurs in a load being supplied by a power generator, a number of pole slips expected to occur in the generator due to the fault before resynchronization is estimated. It is determined whether the estimated number of pole slips exceeds a threshold. An offline or online status of the generator is controlled based on the determination as to whether the estimated number of pole slips exceeds the threshold.

20 Claims, 9 Drawing Sheets

US 9,270,120 B2

METHODS, SYSTEMS, AND COMPUTER READABLE MEDIA FOR ADAPTIVE OUT OF STEP PROTECTION FOR POWER GENERATORS WITH LOAD RESYNCHRONIZATION CAPABILITY

TECHNICAL FIELD

The subject matter described herein relates to out of step protection for power generators. More particularly, the subject matter described herein relates to methods, systems, and computer readable media for adaptive out of step protection for power generators with load resynchronization capability.

BACKGROUND

Under normal power system operating conditions, electrical power generators operate in a state where the mechanical power supplied to the generator is substantially equal to the electromagnetic power drawn by the load. When a short circuit fault occurs in the power system, particularly on the transmission line connected to the generator, the electromagnetic power decreases along with the output terminal voltage of the generator. The power mismatch, which is the difference between the mechanical and electromagnetic power, will lead to rotor acceleration and, without intervention, will damage the generator.

In order to avoid such damage, generators include out of step protection mechanisms that take the generator offline when a fault occurs. In addition, some generators include resynchronization systems that resynchronize the generator with the power system after the fault is removed or corrected. However, there is no coordination between the out of step protection mechanism and the resynchronization systems of these generators. Accordingly, even if the resynchronization system could resynchronize the generator with the load, the out of step protection mechanism may be activated and take the generator offline. Thus, without coordination between the out of step protection and resynchronization mechanisms, the benefit of having a resynchronization mechanism is reduced.

To avoid these and other difficulties, there exists a need for methods, systems, and computer readable media for adaptive out of step protection for power generators with load resynchronization capability.

SUMMARY

Methods, systems, and computer readable media for adaptive out of step protection for power generators with load resynchronization capability are disclosed. According to one method, when a fault condition occurs in a load being supplied by a power generator, a number of pole slips expected to occur in the generator due to the fault before resynchronization is estimated. It is determined whether the estimated number of pole slips exceeds a threshold. An offline or online status of the generator is controlled based on the determination as to whether the estimated number of pole slips exceeds the threshold.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the drawings will now be described of which.

DETAILED DESCRIPTION

Figure 1:
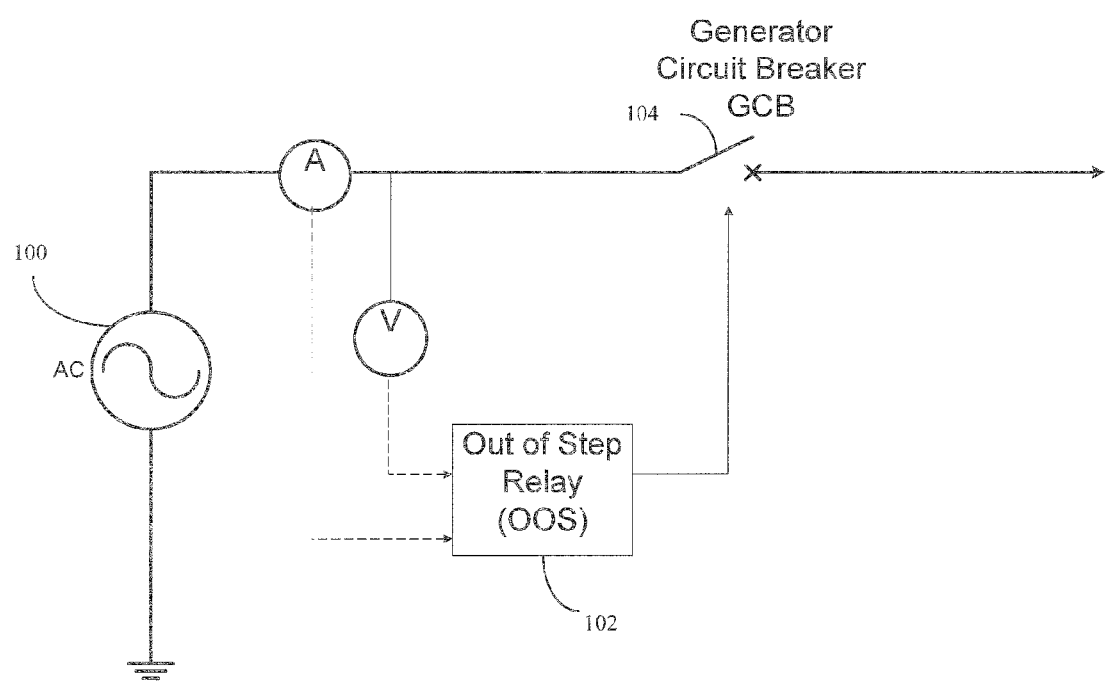
FIG. 1 is a circuit diagram of a typical configuration for generator out of step protection.

As stated above, one existing technique for protecting generators against out of step consists of measuring the number of occurrences of pole slips [3]. A pole slip occurs when the generator internal generated voltage is in phase opposition or 180 degrees out of phase with the load being supplied by the generator. One method for counting pole slips is based on the movement of the apparent impedance measured at the terminals of the generator. The apparent impedance is a complex number that can be calculated by taking the ratio of the nodal voltage of the generator terminals and the load current flowing from the terminals to the load. In a typical implementation, the nodal voltages and generator currents are measured from voltage sensor (V) and current sensor (A) connected at the terminals of generator 100 as shown in FIG. 1. These measurements are fed into an out of step relay which is capable of sending a trip signal to the main generator circuit breaker (GCB) 104.

Figure 2:
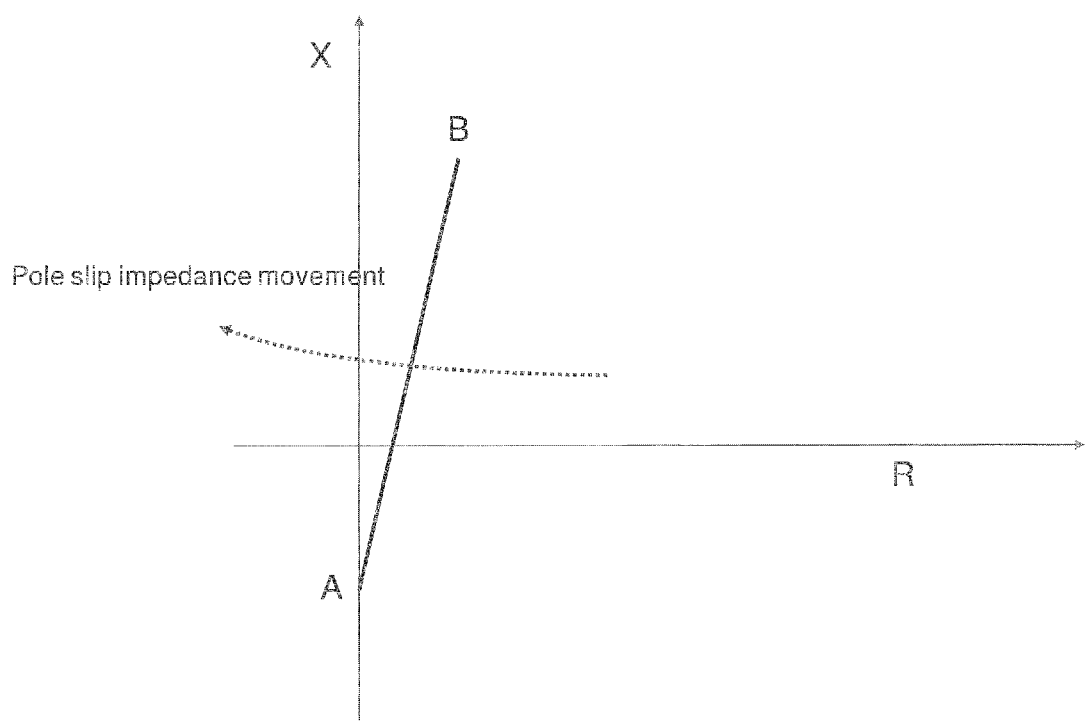
FIG. 2 is a graph illustrating movement of apparent impedance when a pole slip occurs.

To count the number of pole slips within out of step relay (OOS) 102, the movement of the apparent impedance may be mapped into the relay's impedance characteristic, one implementation of which is a straight line as depicted by line AB in FIG. 2. FIG. 2 is a graph of resistance (horizontal axis) versus reactance (vertical axis). The line AB represents impedance characteristic of out of step relay 102. The apparent impedance measured by the current and voltage sensors at the generator output terminals comprise a line that rotates in a direction shown by the arrow in FIG. 2 each time a power swing occurs. Each time the apparent impedance crosses line AB in the direction of the arrow, a pole slip is counted. When this count exceeds a pre-defined threshold OOS relay 102 sends the trip signal to generator circuit breaker 104.

Setting the maximum number of pole slips for out of step relays may be based on several considerations, including generating unit wear and tear. Another factor to consider is the additional cost incurred due to outage of the generator. When a generator is tripped it takes time to bring it back to service, especially when thermodynamic processes drive the generator prime mover, such as in coal or oil-fired thermal power plant. During this waiting time, sometimes referred to as minimum down time, alternative power is generated from costlier generating units, resulting in increased production cost for the power system. Examples of costlier units include combustion turbines. In some power systems, reliability and continuity of service is the primary factor for setting the maximum allowable pole slips. A sudden loss of generating unit will also result in a system load-generation imbalance that will depress the system frequency. If the frequency goes below an acceptable value, under-frequency load shedding systems begin to trip load to arrest impending system collapse. Thus, a generator trip may be accompanied by undesirable load shedding or worse by a system collapse due to the inability of the remaining system to stabilize the generator power output frequency.

Figure 3:
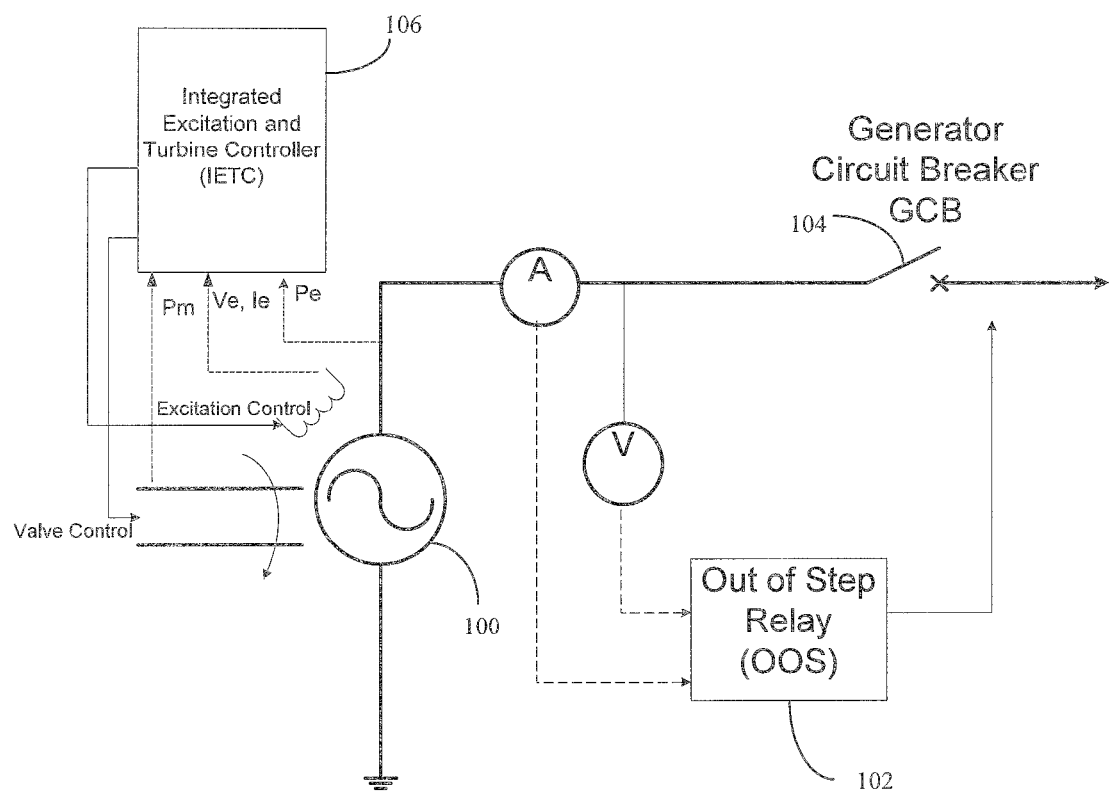
FIG. 3 is a block diagram of a generator with a load resynchronization system which in this example is an integrated excitation and turbine controller (IETC)

As stated above, one problem with existing schemes for out of step protection is that sometimes generators can recover from multiple slip operation and back into stable operation with properly designed load resynchronization systems, such as an integrated excitation and turbine control system (hereinafter, "IETC"), which aims to improve the dynamic performance and enhance transient stability of generators by controlling the exciter and the governor in a coordinated way. An example of an IETC is disclosed in International Patent Application Publication No. WO 2012/055115, the disclosure of which is incorporated herein by reference in its entirety. FIG. 3 shows one implementation of an IETC.

Referring to FIG. 3, IETC 106 is capable of resynchronizing generator 100 when a load fault occurs and is restored. Faults normally occur on the transmission line connected to the generator. Load of the generator is restored when this fault is cleared or isolated from the electrical network by the action of the transmission lines own protection system. IETC 106 receives as input mechanical power supplied to generator 100 by its driving system, such as a turbine, electrical power produced by generator 100, and excitation voltage and current. IETC 106 outputs an excitation control signal, which controls the electrical output of the generator as well as one or more valve control signals that control steam turbine valves to adjust mechanical power supplied to the generator.

One principle of an IETC is to provide auxiliary excitation and turbine control signals based on the measurements and built-in control algorithms of a high-level controller. Self-adaptive is one of the features of the IETC solution. The auxiliary control signals will be calculated according to the fault severity and the generator operating mode to achieve better oscillation damping capability under small disturbances, to ensure first swing stability under moderate disturbances, and to re-synchronize the generator after a few pole slips under severe disturbances [1].

As stated above, if there is no coordination between IETC 106 and the out-of-step protection logic implemented by relay 102, generator 100 will always be tripped off line when the pole slips exceed the number fixed by the out of step protection logic, which results in loss of one of the potential benefits of IETC 106 in reducing the risk of out-of-step tripping. However, with properly designed coordinated controls, unexpected generator tripping can be avoided when there is a possibility to re-synchronize the generator. In addition, generator 100 can be tripped off line prematurely if generator 100 is predicted to go unstable. In this case, generator 100 can be saved from excessive wear and tear by undergoing prolonged pole slips.

In summary at least some problems overcome by the subject matter described herein include:

1. Existing non-adaptive out of step relay settings prevent generators from recovering from multiple pole slips.
2. Non-adaptive settings expose the unit to prolonged wear and tear if the unit finally goes unstable (that is, the pole slip numbers can be excessive).
3. Non-adaptive settings can contribute to system collapse following a generator outage.

Figure 4:
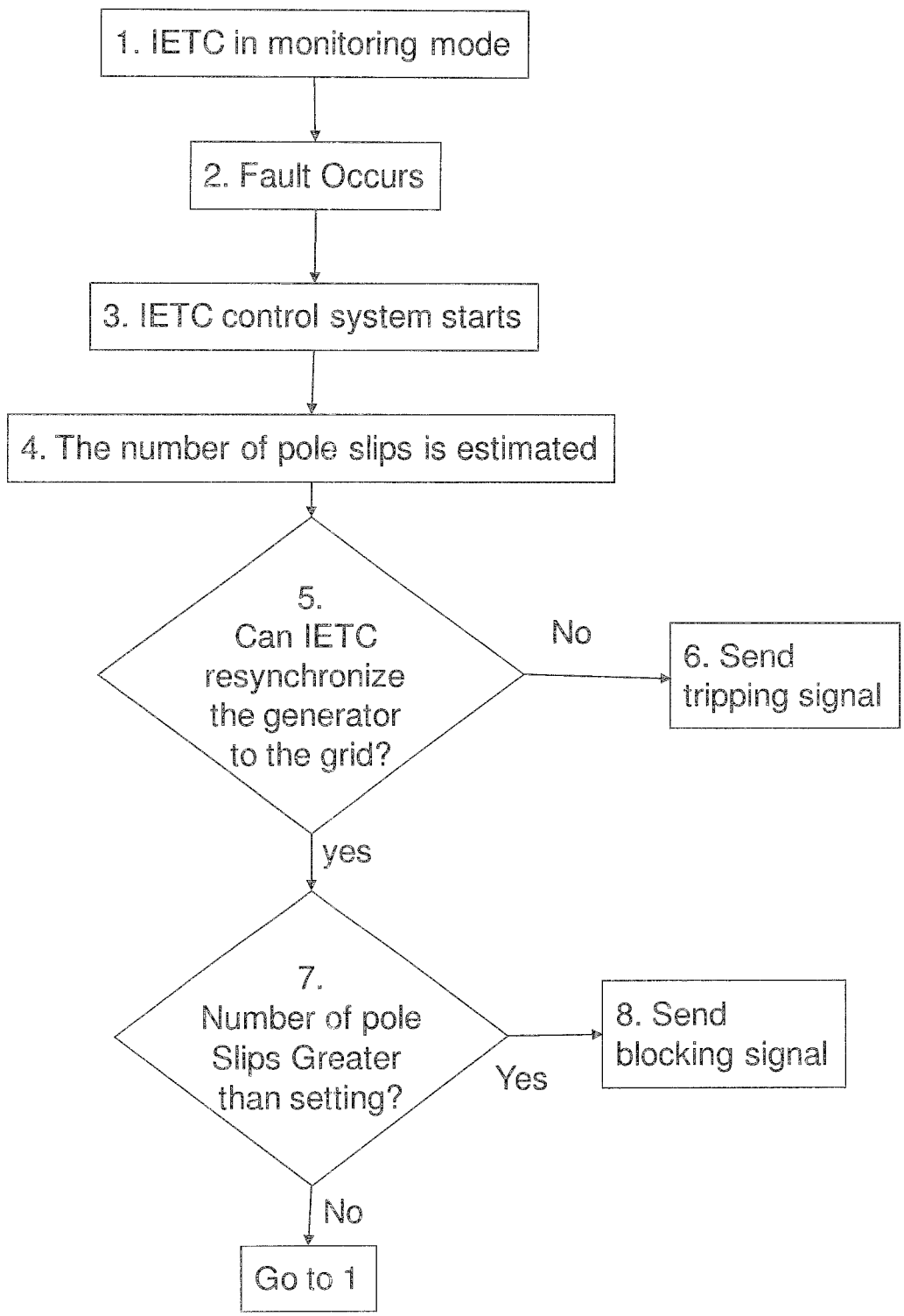
FIG. 4 is a flow chart illustrating exemplary steps for adaptive out of step protection for power generators with load resynchronization capability according to an embodiment of the subject matter described herein.

FIG. 4 is a flow chart illustrating exemplary steps for adaptive out of step protection for power generators according to an embodiment of the subject matter described herein. Referring to FIG. 4, in step 1, the IETC is placed in monitoring mode to monitor load faults. In step 2, the IETC detects the occurrence of a fault, such as a short circuit in the load. In step 3, the IETC operates to attempt to resynchronize the generator with the load. The triggering of the IETC may depend on the severity of the fault. In step 4, the number of pole slips is estimated. The number of pole slips may be estimated by an adaptive out of step protection function which will be described in detail below. In step 5, it is determined whether the IETC can resynchronize the generator to the load, such as a power distribution grid to which the generator is connected. The determination in step 5 may be made by finding a solution to the equation $W_{ac} - W_{dc} = 0$, where $W_{ac}$ is the acceleration energy, and $W_{dc}$ is the deceleration energy. If there is no solution to this equation, then the IETC cannot resynchronize the generator to the grid. If a mathematical solution exists, another check is made to see if the solution is practical. If the mathematical solution is impractical, such as when the solution results in a number of pole slips that is too high, the IETC will not resynchronize. In short, resynchronization may be possible if the solution to $W_{ac} - W_{dc}$ exists and that results in a number of pole slips n that falls within a reasonable bound.

In step 5, if it is determined that the IETC cannot resynchronize the generator to the grid, a tripping signal is sent to the generator circuit breaker. If it is determined that the IETC can resynchronize the generator to the grid, control proceeds to step 7 where it is determined whether the number of pole slips is greater than the threshold used by the out of step relay. If the number of pole slips is greater than the threshold, control proceeds to step 8 where the adaptive out of step control function sends a blocking signal to block the tripping of the out of the step relay. If the number of pole slips is not greater than the setting for the out of step relay, control returns to step 1 where the IETC continues to monitor for load faults.

Figure 5:
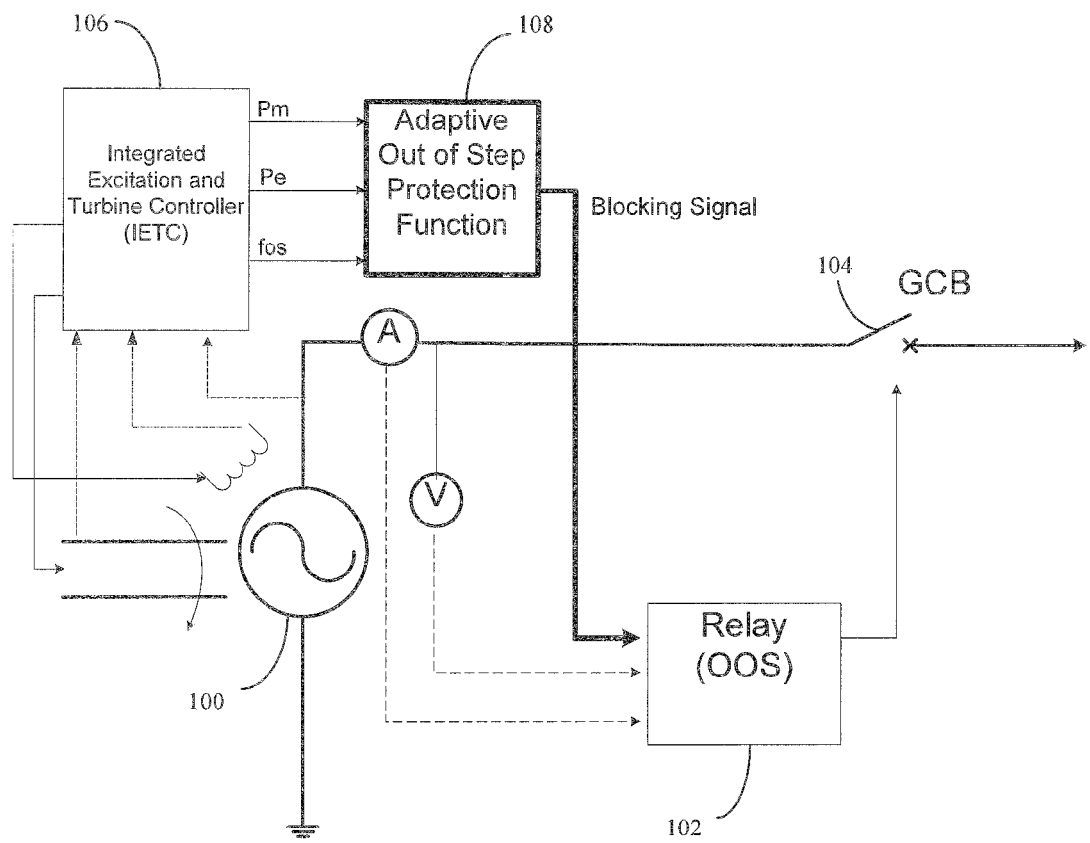
FIG. 5 is a block diagram of a system for adaptive out of step protection for power generators with load resynchronization capability according to an embodiment of the subject matter described herein.

FIG. 5 is a schematic diagram illustrating a generator with load resynchronization capabilities where the load resynchronization capabilities are coordinated with the out of step protection mechanism by an adaptive out of step protection function according to an embodiment of the subject matter described herein. Referring to FIG. 5, adaptive out of step protection function 108 receives a mechanical power signal, an electrical power signal, and an oscillation frequency signal from IETC 106. If the signals indicate that IETC 106 can resynchronize generator 100 with the load and the number of pole slips is greater than a setting for relay 102, IETC 106 sends a blocking signal to relay 102 to block relay 102 from opening generator circuit breaker 104.

Figure 6:
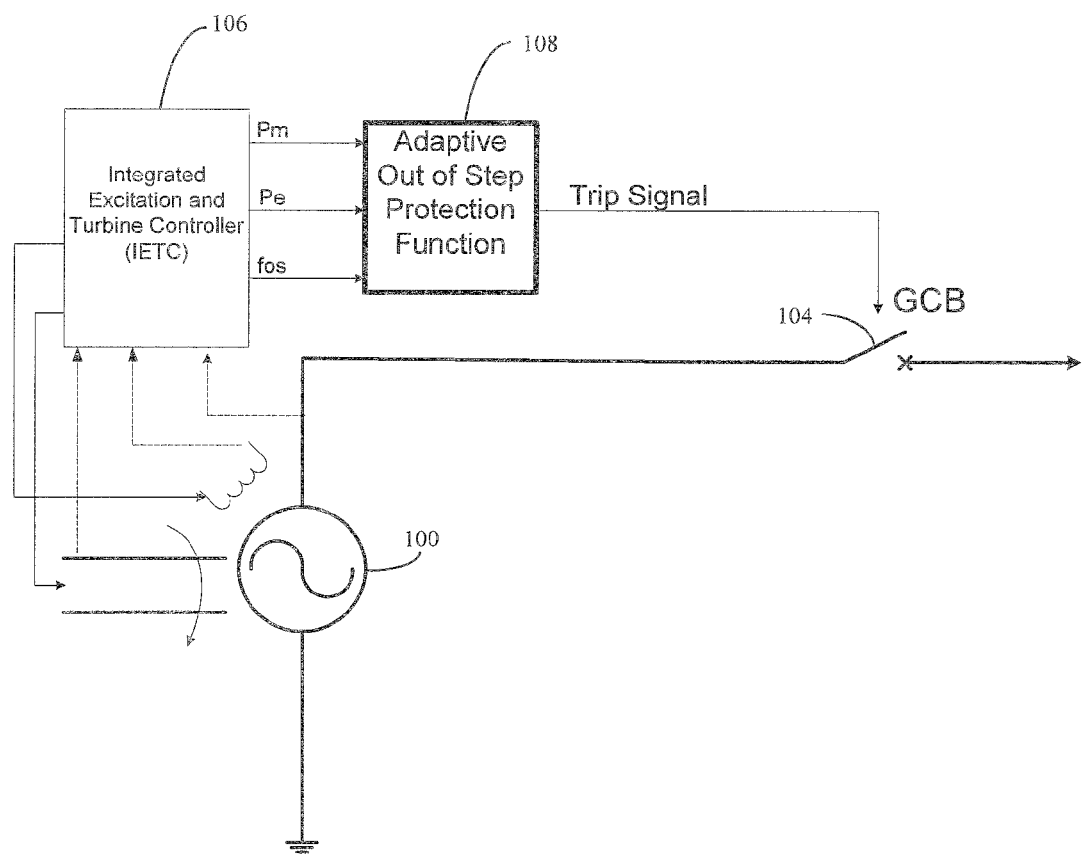
FIG. 6 is a block diagram illustrating an alternate implementation of a system for adaptive out of step protection for power generators with load resynchronization capability according to an embodiment of the subject matter described herein.

FIG. 6 is a schematic diagram illustrating an alternate implementation of the subject matter described herein where adaptive out of step protection function 108 directly controls generator circuit breaker 104. In such an embodiment, relay 102 is omitted and the functionality of generating the signal for tripping circuit breaker 104 is integrated within adaptive out of step protection function 108. As such, adaptive out of step protection function 108 operates similarly to the steps illustrated in FIG. 4. However, rather than generating a blocking signal, adaptive out of step protection function 108 may generate a trip signal if adaptive out of step protection function 108 determines that resynchronization is not possible and may refrain from generating the trip signal if adaptive out of step protection function 108 determines that resynchronization is possible and the number of pole slips does not exceed a predetermined setting.

In order to generate the blocking signal or the trip signal, adaptive out of step protection function 108 may estimate the number of pole slips. An exemplary algorithm used by adaptive out of step protection function 108 for estimating the number of pole slips that may occur before resynchronization will now be described.

Estimating the Number of Pole Slips

Two forces are acting on the generator during a load fault, an accelerating power due to the mechanical prime mover and a decelerating power due to asynchronous power $P_{asyn}$ from the system. Through time, the energy resulting from these two powers will equal, and the generator can be resynchronized back to the grid. The energies result from integrating these powers with time. $W_{ac}$ is contributed by the time integration of mechanical power $P_m$, while $W_{dc}$ is contributed by the time integration of asynchronous power $P_{asyn}$. At the time when $W_{ac}=W_{dc}$, it is possible to resynchronize the generator with the load.

Synchronous power $P_{syn}$ does not contribute for $W_{ac}$ or $W_{dc}$ because as a sinusoidal function of the power angle, the time integration of $P_{syn}$ within one oscillation period is zero.

Acceleration Energy $W_{ac}$ Calculation

Figure 7:
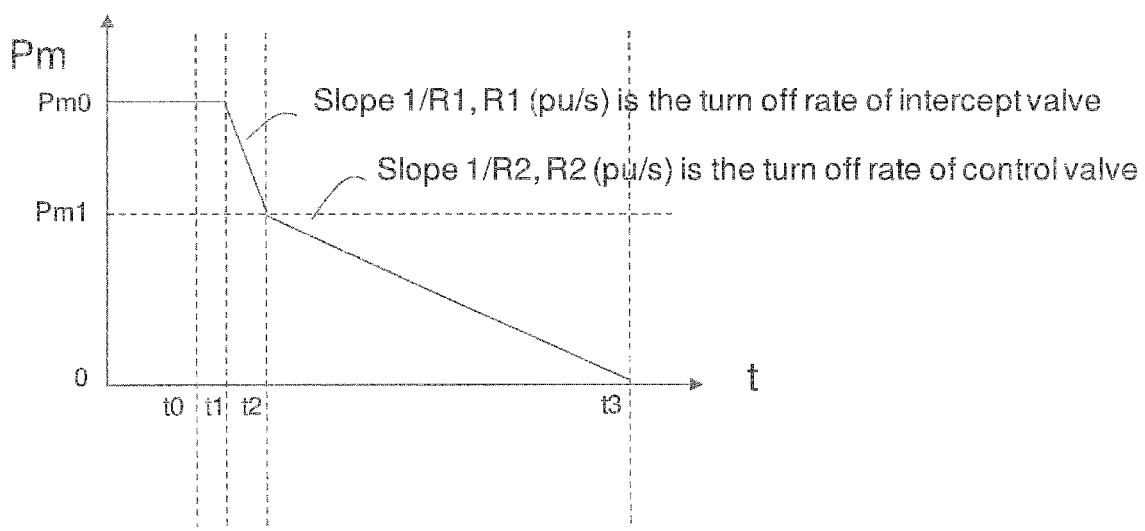
FIG. 7 is a graph illustrating approximation of mechanical power that may be determined by an adaptive out of step protection function according to an embodiment of the subject matter described herein.

FIG. 7 shows an approximation for the calculation of mechanical power according to the subject matter described herein. At time $t=t_0$ the fault occurs, and IETC will use the time integration of the difference between mechanical power $P_m$ and electrical power $P_e$ to determine the severity of this fault. If the integration is lower than certain level $C_1$, this fault will be categorized as small fault, and IETC chooses not to actuate; if the integration is higher than $C_1$ but lower than another level $C_2$, this fault will be categorized as moderate fault, and IETC will act on control valve and excitation system; if the integration is higher than $C_2$ then this fault will be categorized as severe fault, and the IETC will act on both intercept valve and control valve, and also excitation system.

Under the worst case scenario, severe disturbance occurs and the time integration of $P_m-P_e$ will exceed level $C_2$ at time $t_1$, when the IETC will start to close both intercept valve and control valve to limit excessive accelerating power. Let the turn off rate of the intercept valve to be $R_1$ per-unit per second, while that of the control valve to be $R_2$ per-unit per second, which is usually much smaller than $R_1$.

For simplicity of illustration, it can be assumed that the intercept valve is closed during time period $t_1 \sim t_2$ with a rate $R_1$, and the control valve is closed during time period $t_2 \sim t_3$ with the rate $R_2$. At time $t=t_3$, both the intercept valve and the control valve are fully closed. Before the fault the generator is being driven by the pre-fault mechanical power $P_{m0}$. The value of mechanical power when intercept valve closes is $P_{m1}$. This power is equal to the difference in the pre-fault value $P_{m0}$ and $F_{IP}$, where $F_{IP}$ is the friction of the total turbine power generated by intermediate pressure stage which is controlled by the intercept valve directly. Formally, the locus of the expected mechanical power in FIG. 7 can be expressed mathematically by the following expression:

$$P_m = \begin{cases} -R_1 F_{IP} t + P_{m0}, & t_1 < t \le t_2 \\ (P_{m0} - F_{IP}) \cdot \left(-R_2 t + \frac{R_1 + R_2}{R_1}\right), & t_2 < t \le t_3 \end{cases}$$

Figure 8:
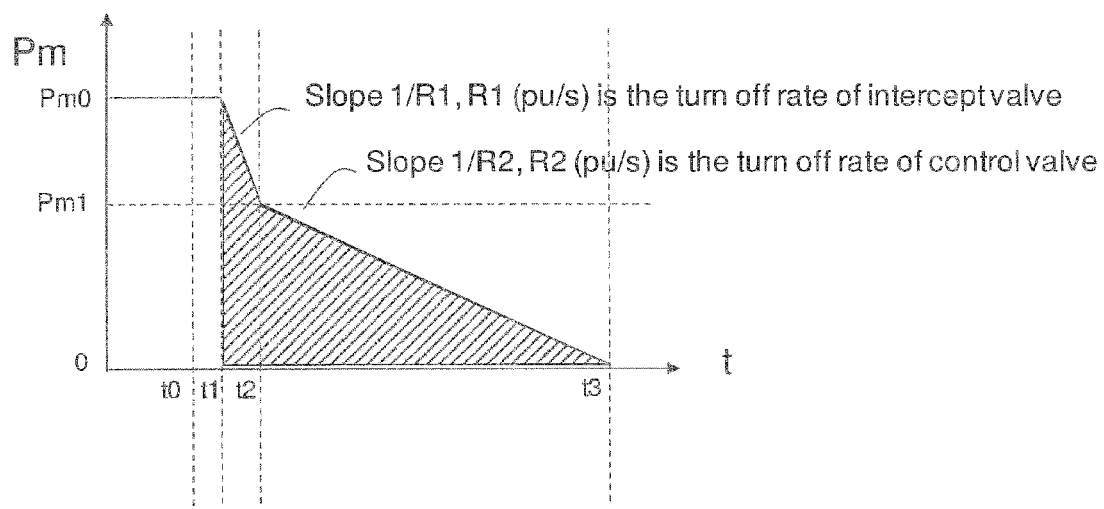
FIG. 8 is a graph illustrating an exemplary curve for calculation of acceleration energy by an adaptive out of step protection function according to an embodiment of the subject matter described herein.

The acceleration energy after IETC actuation is shown as the shaded area in FIG. 8. It is numerically equal to $$W'_{ac} = \frac{2P_{m0} - F_{IP}}{2R_1} + \frac{P_{m0} - F_{IP}}{2R_2}$$

Together with the accelerating energy before ETC actuation, which is equal to the threshold $C_2$ for severe fault identification, the total accelerating energy $W_{ac}$ is equal to $$W_{ac} = W'_{ac} + C_2$$

It is to be understood that the mechanical power response determined by the adaptive out of step protection function is not restricted to the example shown in FIG. 7. Some turbine systems may not have intercept valve, so it is recognized that the response may be different and that the adaptive out of step protection function may be modified to account for such differences. The method for integrating the power to obtain the energy as illustrated will still apply under this condition and in other situations.

Deceleration Energy $W_{dc}$ Calculation

The active power of generator consists of two parts during asynchronous rotation: a) Synchronous power $P_{syn}$, which varies between positive and negative with power angle as a sinusoidal function, does not contribute for rotor speed deviation in average, b) Asynchronous power $P_{asyn}$ which is positive because the rotor speed is higher than the synchronous speed, contribute to rotor deceleration.

$P_{asyn}$ can be estimated as follows:

$$P_{asyn} = P_{st} \left(\frac{X'_d E}{X'_d + X_{ext}}\right)^2$$

where
$P_{st}$ can be approximated as constant, equals to 2 per unit power for a steam-turbine generator [2]
$X_d'$ is the generator d-axis transient reactance—it is available as a nameplate value from generator
$X_{ext}$ is external impedance, this is usually the sum of reactances of all components external to the generator such as step-up transformer, outgoing lines, etc. This external impedance could be pre-determined considering conservative assumptions, such as reduced connection between the power plant and the grid system due to possible outage of transmission line.

E the voltage of the infinite power system

Then the decelerating energy $W_{dc}$ can be calculated as follows $$W_{dc} = \int P_{asyn} dt = P_{st} \left( \frac{X'_d E}{X'_d + X_{ext}} \right)^2 t$$

Pole Slip Number N Estimation

The time elapsed when accelerating and decelerating energy are equal can be calculated from the earlier equations and shown below.

$$t | W_{ac} = W_{dc} = \frac{1}{P_{st}} \left( \frac{2P_{m0} - F_{IP}}{2R_1} + \frac{P_{m0} - F_{IP}}{2R_2} + C_2 \right) \left( \frac{X'_d + X_{ext}}{X'_d E} \right)^2$$

Assume $f_{os}$ is the oscillation frequency of the generator after fault clearance, then the number of pole slips can be estimated as follows:

$$N = t \times f_{os}$$

Illustration of Estimation of Number of Pole Slips

Figure 9:
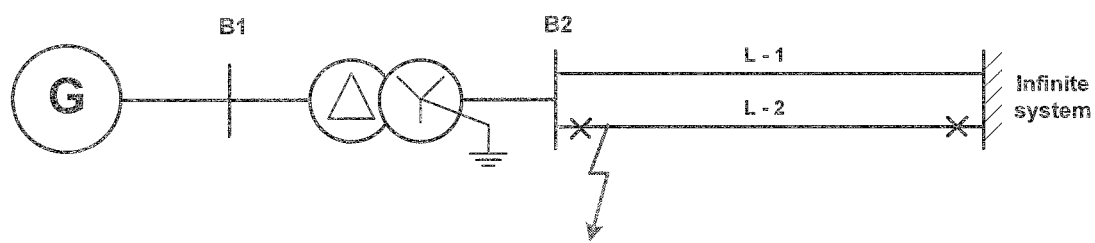
FIG. 9 is a circuit diagram illustrating an example of estimating the number of pole slips by an adaptive out of step protection function according to an embodiment of the subject matter described herein.

A single machine infinite system is shown in FIG. 9, consisting of a synchronous generator, step-up transformer, double-circuit transmission lines, and infinite voltage source. A three-phase short-circuit fault occurs at the transmission line L-2, which is tripped off 0.21 s later.

Assume $P_{m0}=0.9$ pu, $F_{IP}=0.4$, $R_1=5$ pu/s, $R_2=0.5$ pu/s, $C_2=0.1$, $X_d'=3$, $X_{ext}=0.4$, $E=1$, $P_{st}=2$; the oscillation frequency $f_{os}$ of generator is 1.25 Hz.

Under this 0.21 s three-phase short-circuit fault, the number of pole slip can be calculated as follows Total accelerating energy $W_{ac}=W_{ac}'+C2=0.64+0.1=0.74$
Total decelerating energy $W_{dc}=0.36t$
Intersection point $t=0.74/0.36=2$ sec
Estimated number of pole slips: $t \times f_{os}=2.5$ Advantages 1. Advantages of the subject matter described herein include:
   The number of pole slips can be estimated allowing generator to ride through the disturbance when necessary
   Allows proper coordination of Integrated Excitation and Turbine Control System and Out of Step Protection
   Improves system reliability and economic operation by minimizing generator tripping due to non-adaptive settings of out of step relay.

2. Problems at least partially overcome:
   The subject matter described herein implements out of step protection with trip settings that are based on (or adaptive to) the operating conditions of the system when the fault happens. The adaptive trip setting is realized by estimation of the number of pole slip operation when IETC is in operation resulting in increased ability of generator to ride through the disturbance.
   The adaptive ability to predict instability or excessive number of pole slip operation allows early tripping of generator from the system. With this enhanced function, the generator can be saved from unnecessary exposure to prolonged wear and tear if the unit will be tripped anyway by its out of step protection.

By increasing incidence of disturbance ride-through of generators with IETC, the new functionality can help control system collapse by maintaining system integrity.

The disclosure of each of the following references is hereby incorporated by reference herein in its entirety.

REFERENCES

[1] PCT/CN2010/078244 "Integrated Excitation and Turbine Controller for Synchronous Generator and the Control Method thereof"

[2] M. Y. Wang. Mechanism of the Resynchronization of Out-of-Step Generator Sets, SOUTHERN POWER SYSTEM TECHNOLOGY, Vol. 1 NO. 2, December 2007.

[3] 1MRK502013-UUS_Technical reference manual Generator protection IED REG 670 ANSI, December 2007, ABB It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for adaptive out of step protection for power generators with load resynchronization capability, the method comprising:
   in response to the occurrence of a fault condition in a load being supplied by a power generator:
      estimating a number of pole slips expected to occur in the generator before resynchronization due to the fault;
      determining whether the estimated number of pole slips exceeds a threshold; and
      controlling an offline or online status of the generator based on the determination as to whether the estimated number of pole slips exceeds the threshold.

2. The method of claim 1 comprising determining whether resynchronization is possible and wherein determining whether the estimated number of pole slips exceeds the threshold includes determining whether the estimated number of pole slips exceeds the threshold in response to determining that resynchronization is possible.

3. The method of claim 1 wherein estimating the number of pole slips includes estimating the number of pole slips based on mechanical power, acceleration energy, and deceleration energy.

4. The method of claim 3 wherein estimating the number of pole slips based on mechanical power, acceleration energy, and deceleration energy comprises:
   determining a time expected to elapse from fault restoration until a time when acceleration and deceleration energy are equal to each other;
   determining a frequency of oscillation of the generator after the fault restoration; and
   estimating the number of pole slips based on the elapsed time and the frequency of oscillation of the generator after the fault restoration.

5. The method of claim 3 comprising estimating the mechanical power based on estimated turnoff rates of an intercept valve and a control valve of a turbine coupled to the generator.

6. The method of claim 5 comprising estimating the acceleration energy based on the mechanical power and the estimated turnoff rates.

7. The method of claim 5 comprising calculating the deceleration energy based on asynchronous power of the generator d-axis transient reactance, external impedance, and voltage of the load.

8. The method of claim 2 wherein the determination as to whether resynchronization with the load is possible is made by an integrated excitation and turbine control system (IETC).

9. The method of claim 1 wherein controlling the offline or online status of the generator includes blocking an out of step protection signal to keep the generator online in response to determining that the estimated number of pole slips does not exceed the threshold.

10. The method of claim 1 wherein controlling the offline or online status of the generator includes directly controlling a generator circuit breaker to keep the generator online or take the generator offline based on whether the estimated number of pole slips exceeds the threshold.

11. A system for adaptive out of step protection for power generators with load resynchronization capabilities, the system comprising:
 a generator load resynchronization system for, in response to the occurrence of a fault condition occurring in a load being powered by the generator, attempting to resynchronize the generator with the load; and
 an adaptive out of step protection function for estimating the number of pole slips expected to occur in the generator due to the fault before resynchronization, determining whether the estimated number of pole slips exceeds a threshold, and controlling an offline or online status of the generator based on the determination as to whether the estimated number of pole slips exceeds the threshold.

12. The system of claim 11 wherein the generator load resynchronization system is adapted to attempt to resynchronize the generator with the load in response to a determination that resynchronization is possible.

13. The system of claim 11 wherein the adaptive out of step protection function is configured to estimate the number of pole slips based on mechanical power, acceleration energy, and deceleration energy.

14. The system of claim 13 wherein the adaptive out of step protection function is configured to:
 determine an amount of time expected to elapse from fault restoration until a time when acceleration and deceleration energy are equal to each other;
 determine a frequency of oscillation of the generator after the fault restoration; and
 estimate the number of pole slips based on the time expected to elapse and the frequency of oscillation of the generator after the fault restoration.

15. The system of claim 13 wherein the adaptive out of step protection function is configured to estimate the mechanical power based on estimated turnoff rates of an intercept valve and a control valve of a turbine coupled to the generator.

16. The system of claim 15 wherein the adaptive out of step protection function is configured to estimate the acceleration energy based on the mechanical power and the estimated turnoff rates.

17. The system of claim 16 wherein the adaptive out of step protection function is configured to calculate the deceleration energy based on asynchronous power of the generator d-axis transient reactance, external impedance, and voltage of the load.

18. The system of claim 11 wherein the adaptive out of step protection function is configured to control the offline or online status of the generator by blocking an out of step protection signal to keep the generator online in response to determining that the estimated number of pole slips does not exceed the threshold.

19. The system of claim 11 wherein the adaptive out of step protection function is configured to control the offline or online status of the generator by directly controlling a generator circuit breaker to keep the generator online or take the generator offline based on whether the estimated number of pole slips exceeds the threshold.

20. A non-transitory computer readable medium having stored thereon executable instructions that when executed by the processor of a computer control the computer to perform steps comprising:
 in response to the occurrence of a fault condition in a load being supplied by a power generator:
  estimating a number of pole slips expected to occur in the generator before resynchronization due to the fault;
  determining whether the estimated number of pole slips exceeds a threshold; and
  controlling an offline or online status of the generator based on the determination as to whether the estimated number of pole slips exceeds the threshold.

* * * * *